US008695445B2

(12) United States Patent
Laurer et al.

(10) Patent No.: US 8,695,445 B2
(45) Date of Patent: Apr. 15, 2014

(54) WEAR-INDICATING SYSTEM FOR USE WITH TURBINE ENGINES AND METHODS OF INSPECTING SAME

(75) Inventors: Kurt Neal Laurer, Saratoga Springs, NY (US); Eloy Vincent Emeterio, Amsterdam, NY (US); Michael Thomas Hamlin, Burnt Hills, NY (US); Kraig Martin Sanderson, East Berne, NY (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 13/103,284

(22) Filed: May 9, 2011

(65) Prior Publication Data

US 2012/0285226 A1 Nov. 15, 2012

(51) Int. Cl.
*F04D 29/00* (2006.01)
*G01N 17/00* (2006.01)

(52) U.S. Cl.
USPC ........... 73/865.8; 73/86; 73/112.01; 116/208; 415/118

(58) Field of Classification Search
USPC ......... 73/86, 865.8, 112.01–112.06; 415/118; 116/208
See application file for complete search history.

(56) References Cited

U.S. PATENT DOCUMENTS

| | | | | |
|---|---|---|---|---|
| 6,139,268 | A * | 10/2000 | Murawski et al. | 416/23 |
| 6,525,334 | B1 | 2/2003 | Brackett | |
| 6,738,680 | B2 * | 5/2004 | Nesbitt | 700/97 |
| 7,089,165 | B2 | 8/2006 | Araki et al. | |
| 2007/0231156 | A1 * | 10/2007 | Hong | 416/241 R |
| 2009/0293596 | A1 | 12/2009 | Ehehalt et al. | |
| 2011/0162241 | A1 * | 7/2011 | Wangsness | 37/266 |
| 2011/0296687 | A1 * | 12/2011 | Hebuterne et al. | 29/889.71 |

FOREIGN PATENT DOCUMENTS

| | | | | |
|---|---|---|---|---|
| EP | 1408201 | A3 | 4/2004 | |
| EP | 2003439 | A1 | 12/2008 | |
| JP | 60043104 | A * | 3/1985 | F01D 25/00 |
| JP | 3170043 | A | 7/1991 | |
| RU | 2020411 | C1 | 9/1994 | |
| SU | 1666920 | A1 | 7/1997 | |
| WO | WO 2010/055263 | A1 * | 5/2010 | F01D 21/00 |

OTHER PUBLICATIONS

English Translation of WO 2010/055263 A1.*

* cited by examiner

*Primary Examiner* — Hezron E Williams
*Assistant Examiner* — Alexander Mercado
(74) *Attorney, Agent, or Firm* — Armstrong Teasdale LLP

(57) ABSTRACT

A wear-indicating system includes a wear-indicating mark applied to a portion of a surface edge margin of an internal component of a turbine. The wear-indicating mark is visually discernible from the surface edge margin through boroscopic inspection. An inner extent of the wear-indicating mark is spaced a pre-selected distance from the surface edge.

20 Claims, 7 Drawing Sheets

WEAR-INDICATING SYSTEM FOR USE WITH TURBINE ENGINES AND METHODS OF INSPECTING SAME

BACKGROUND OF THE INVENTION

The present invention relates generally to turbine engines and more particularly, to a wear-indicating system for use with turbine engines.

At least some known turbines have a defined flow path that includes, in serial-flow relationship, an inlet, a turbine, and an outlet. At least some known steam turbines also include a plurality of stationary diaphragms that direct a flow of steam towards a rotor assembly that includes at least one row of turbine buckets (blades) that are circumferentially-spaced about a rotor disk. Steam channeled to the rotor assembly from the diaphragm assembly impacts airfoils of the turbine buckets to induce rotation of the rotor assembly.

The environment inside the steam engine may facilitate wear and erosion of the rotor assembly, particularly the bucket airfoils. Over time, erosion of airfoils result in rough, uneven airfoil surfaces that alter steam flow paths that may reduce turbine efficiency and/or limit turbine capacity. Erosion of intermediate and low-pressure airfoils is usually caused by water in the steam. For example, operation below design inlet steam temperature or at low load can create condensation in these stages that may cause erosion. Moreover, the entrainment of erosive materials in the steam, such as iron oxide, may also erode the turbine airfoils, particularly at the high-pressure end of the turbine.

Typically, to inspect a turbine, a boroscope is inserted into the interior of the turbine to determine an amount of erosion of the buckets. However, visual inspections enable only qualitative determinations of the amount of erosion. More reliable and accurate quantitative determination of the amount of erosion are generally not possible without disassembly of the turbine. The inability to make a reliable and accurate quantitative determination of the amount of erosion using a boroscope is due, at least in part, to non-standardized magnification of boroscopes and to the lack of measurement references inside the turbine. However, increasing the reliability and accurateness of erosion inspections of internal components of a turbine may facilitate extending the time between outages and improving the efficiency of the turbine.

BRIEF SUMMARY OF THE INVENTION

In one aspect, a wear-indicating system generally comprises a component for use within a turbine. The component comprises a surface defining a surface edge. The surface edge and a corresponding surface edge margin are susceptible to wear during turbine operation. At least one wear-indicating mark is applied to a portion of the surface edge margin. The wear-indicating mark is visually discernible from the surface edge margin through visual inspection. The at least a portion of the wear-indicating mark is spaced a pre-selected distance from the surface edge.

In another aspect, a turbine is provided. The turbine generally comprises a casing defining an interior space. A plurality of turbine buckets are rotatably coupled within the interior space. Each of the turbine buckets comprises an airfoil comprising a leading edge and a trailing edge. A wear-indicating mark is applied to a portion of at least one of a leading edge margin defined adjacent to the leading edge, and a trailing edge margin defined adjacent to the trailing edge. The wear-indicating mark is visually discernible from the leading edge margin and the trailing edge margin when visually inspected. The wear-indicating mark is spaced a pre-selected, chordwise distance from one of the leading edge and the trailing edge.

In yet another aspect, a method for inspecting an internal component in an interior of a turbine generally comprises applying a wear-indicating mark to a surface edge margin of the component. The wear-indicating mark is visually discernible from the surface edge margin through visual inspection, and a portion of the wear-indicating mark is spaced a pre-selected distance from a corresponding surface edge of the surface edge margin.

DETAILED DESCRIPTION OF THE INVENTION

The exemplary apparatus and methods described herein overcome at least some disadvantages of known systems and methods for use in determining an amount of erosion of an internal component of a turbine. Moreover, the apparatus and methods described herein enable a reliable quantitative determination of the amount of wear of the internal component of the turbine to be determined More specifically, the embodiments described herein each require at least one wear-indicating mark be included on a surface of an internal component of the turbine that is visually discernible from the surface of the component and that is spaced a pre-determined distance inward from a surface edge of the component that is susceptible to erosion. Although the illustrated apparatus and methods described herein are directed toward a steam turbine, the present invention is not limited to steam turbines. Thus, the scope of the present invention encompasses other types of turbines, including, but not limited to, gas and water turbines.

As used herein, the term "turbine bucket" is used interchangeably with the term "bucket" and thus can include any combination of a bucket that includes a platform and a dovetail, and/or a bucket that is integrally formed with a rotor disk, either embodiment of which may include at least one airfoil segment.

Figure 1:
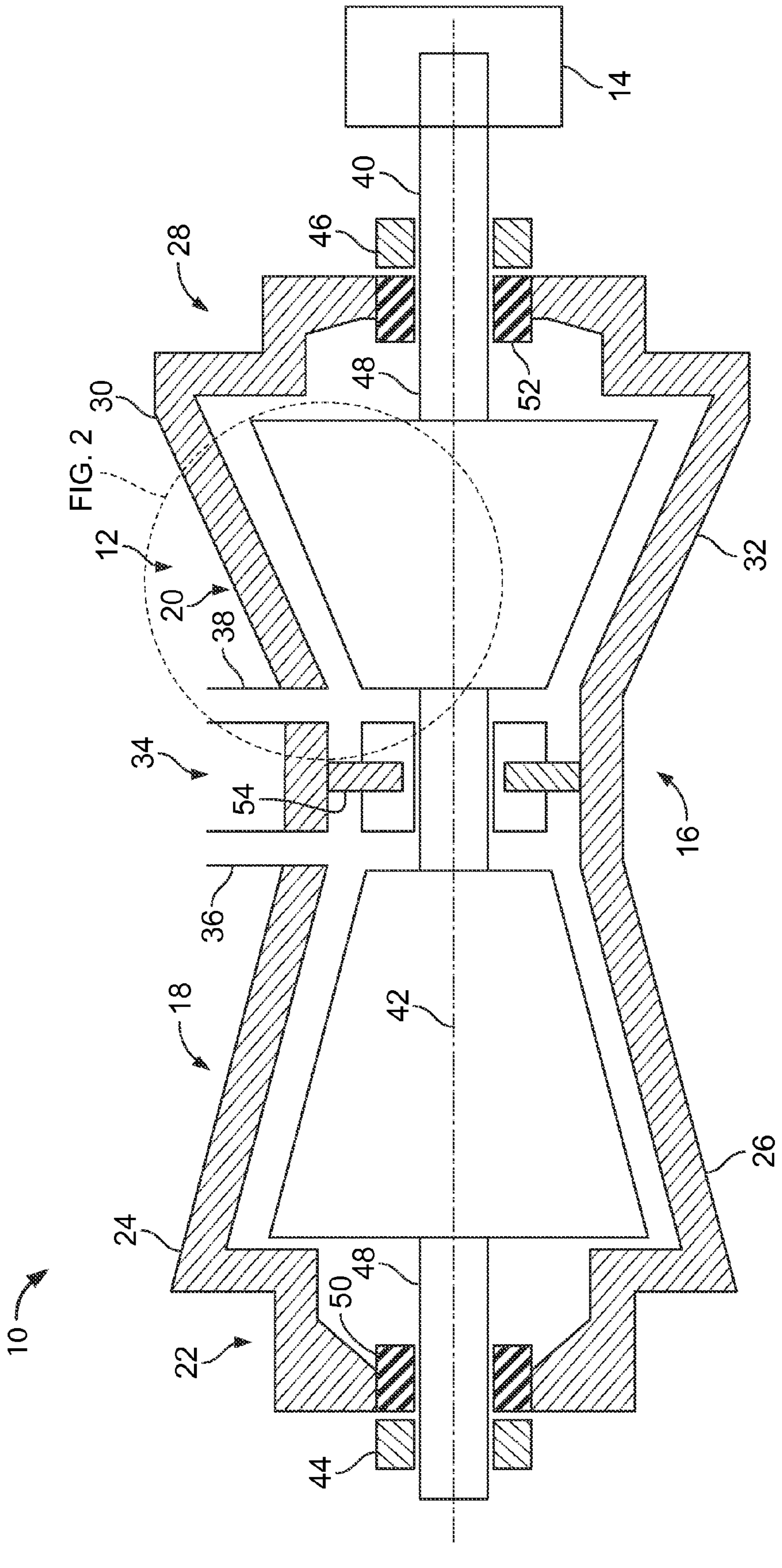
FIG. 1 is a schematic view of an exemplary steam turbine engine.

FIG. 1 is a schematic view of an exemplary turbine engine 10. In the exemplary embodiment, turbine engine 10 is an opposed-flow, high-pressure and intermediate-pressure steam turbine combination. Alternatively, turbine engine 10 may be any type of steam turbine, such as, without limitation, a low-pressure turbine, a single-flow steam turbine, and/or a double-flow steam turbine. In the exemplary embodiment, turbine engine 10 includes a turbine 12 that is coupled to a generator 14 via a rotor assembly 16. Moreover, in the exemplary embodiment, turbine 12 includes a high pressure (HP) section 18 and an intermediate pressure (IP) section 20. An HP casing 22 is divided axially into upper and lower half sections 24 and 26, respectively. Similarly, an IP casing 28 is divided axially into upper and lower half sections 30 and 32, respectively. A central section 34 extends between HP section 18 and IP section 20, and includes an HP steam inlet 36 and an IP steam inlet 38. Rotor assembly 16 extends between HP section 18 and IP section 20 and includes a rotor shaft 40 that extends along a centerline axis 42 between HP section 18 and IP section 20. Rotor shaft 40 is supported from casing 22 and 28 by journal bearings 44 and 46, respectively, that are each coupled to opposite end portions 48 of rotor shaft 40. Steam seal units 50 and 52 are coupled between rotor shaft end portions 48 and casings 22 and 28 to facilitate sealing HP section 18 and IP section 20.

An annular divider 54 extends radially inwardly between HP section 18 and IP section 20 from central section 34 towards rotor assembly 16. More specifically, divider 54 extends circumferentially about rotor assembly 16 between HP steam inlet 36 and IP steam inlet 38.

During operation, steam is channeled to turbine 12 from a steam source, for example, a power boiler (not shown), wherein steam thermal energy is converted to mechanical rotational energy by turbine 12, and subsequently electrical energy by generator 14. More specifically, steam is channeled through HP section 18 from HP steam inlet 36 to impact rotor assembly 16 positioned within HP section 18 and to induce rotation of rotor assembly 16 about axis 42. Steam exits HP section 18 and is channeled to a boiler (not shown) that increases a temperature of the steam to a temperature that is approximately equal to a temperature of steam entering HP section 18. Steam is then channeled to IP steam inlet 38 and to IP section 20 at a reduced pressure than a pressure of the steam entering HP section 18. The steam impacts the rotor assembly 16 that is positioned within IP section 20 to induce rotation of rotor assembly 16.

Figure 2:
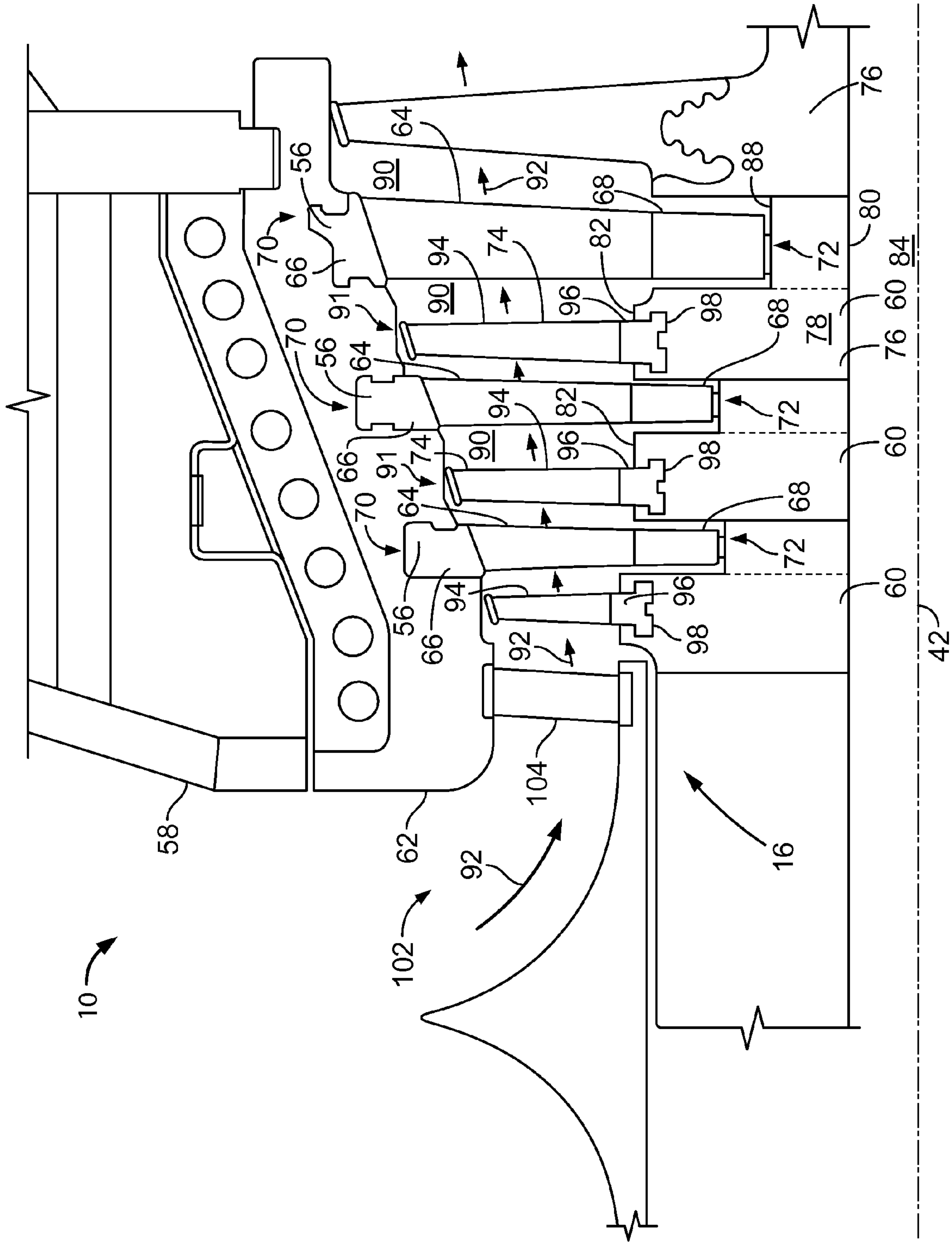
FIG. 2 is a schematic view of a portion of the steam turbine engine shown in FIG. 1 and taken along area 2.

FIG. 2 is a schematic view of a portion of turbine engine 10 taken along area 2. In the exemplary embodiment, turbine engine 10 includes rotor assembly 16, a plurality of stationary diaphragm assemblies 56, and a casing 58 that extends circumferentially about rotor assembly 16 and diaphragm assemblies 56. Rotor assembly 16 includes a plurality of rotor disk assemblies 60 that are each aligned substantially axially between each adjacent pair of diaphragm assemblies 56. Each diaphragm assembly 56 is coupled to casing 58, and casing 58 includes a nozzle carrier 62 that extends radially inwardly from casing 58 towards rotor assembly 16. Each diaphragm assembly 56 is coupled to nozzle carrier 62 to facilitate preventing diaphragm assembly 56 from rotating with respect to rotor assembly 16. Each diaphragm assembly 56 includes a plurality of circumferentially-spaced nozzles 64 that extend from a radially outer portion 66 to a radially inner portion 68. Nozzle outer portion 66 is positioned within a recessed portion 70 defined within nozzle carrier 62 to enable diaphragm assembly 56 to couple to nozzle carrier 62. Nozzle inner portion 68 is positioned adjacent to rotor disk assembly 60. In one embodiment, inner portion 68 includes a plurality of sealing assemblies 72 that form a tortuous sealing path between diaphragm assembly 56 and rotor disk assembly 60.

In the exemplary embodiment, each rotor disk assembly 60 includes a plurality of turbine buckets 74 that are each coupled to a rotor disk 76. Rotor disk 76 includes a disk body 78 that extends between a radially inner portion 80 and a radially outer portion 82. Radially inner portion 80 defines a central bore 84 that extends generally axially through rotor disk 76. Disk body 78 extends radially outwardly from central bore 84, and extends generally axially between an upstream member 86 to an opposite downstream member 88. Rotor disk 76 is coupled to an adjacent rotor disk 76 such that upstream member 86 is coupled to an adjacent downstream member 88.

Each turbine bucket 74 is coupled to rotor disk outer portion 82 such that buckets are circumferentially-spaced about rotor disk 76. Each turbine bucket 74 extends radially outwardly from rotor disk 76 towards casing 58. Adjacent rotor disks 76 are coupled together such that a gap 90 is defined between each axially-adjacent row 91 of circumferentially-spaced turbine buckets 74. Nozzles 64 are spaced circumferentially about each rotor disk 76 between adjacent rows 91 of turbine buckets 74 to channel steam downstream towards turbine buckets 74. A steam flow path 92 is defined between turbine casing 58 and each rotor disk 76.

In the exemplary embodiment, each turbine bucket 74 is coupled to an outer portion 82 of a respective rotor disk 76 such that each turbine bucket 74 extends into steam flow path 92. More specifically, each turbine bucket 74 includes an airfoil 94 that extends radially outwardly from a dovetail 96. Each dovetail 96 is inserted into a dovetail groove 98 defined within an outer portion 82 of rotor disk 76 to enable turbine bucket 74 to be coupled to rotor disk 76.

During operation of turbine engine 10, steam is channeled into turbine 12 through a steam inlet 102 and into steam flow path 92. Each inlet nozzle 104 and diaphragm assemblies 56 channel the steam towards turbine buckets 74. As steam impacts each turbine bucket 74, turbine bucket 74 and rotor disk 76 are rotated circumferentially about axis 42.

Figure 3:
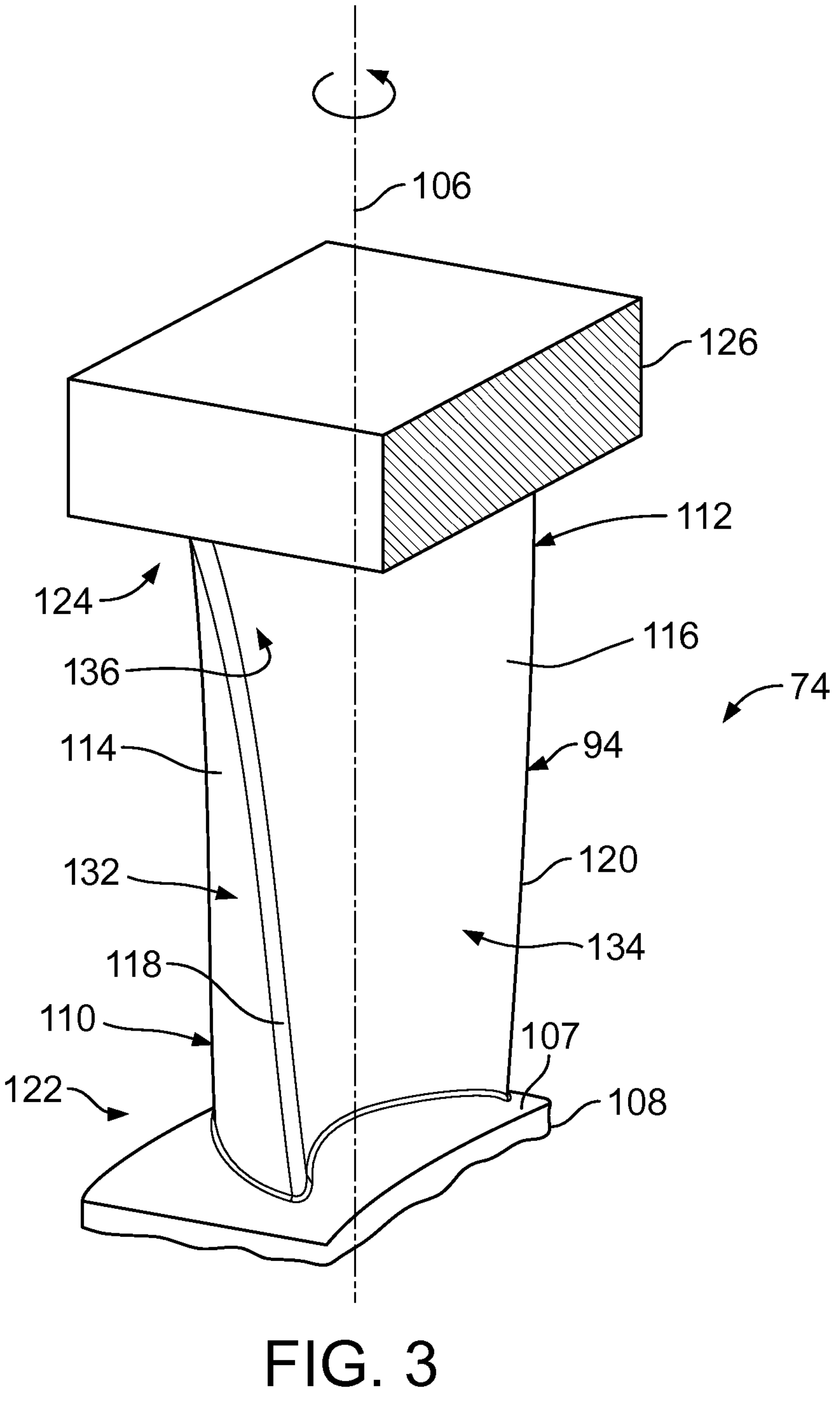
FIG. 3 is an enlarged, fragmentary perspective view of an exemplary turbine bucket removed from the turbine engine shown in FIG. 1.
Figure 4:
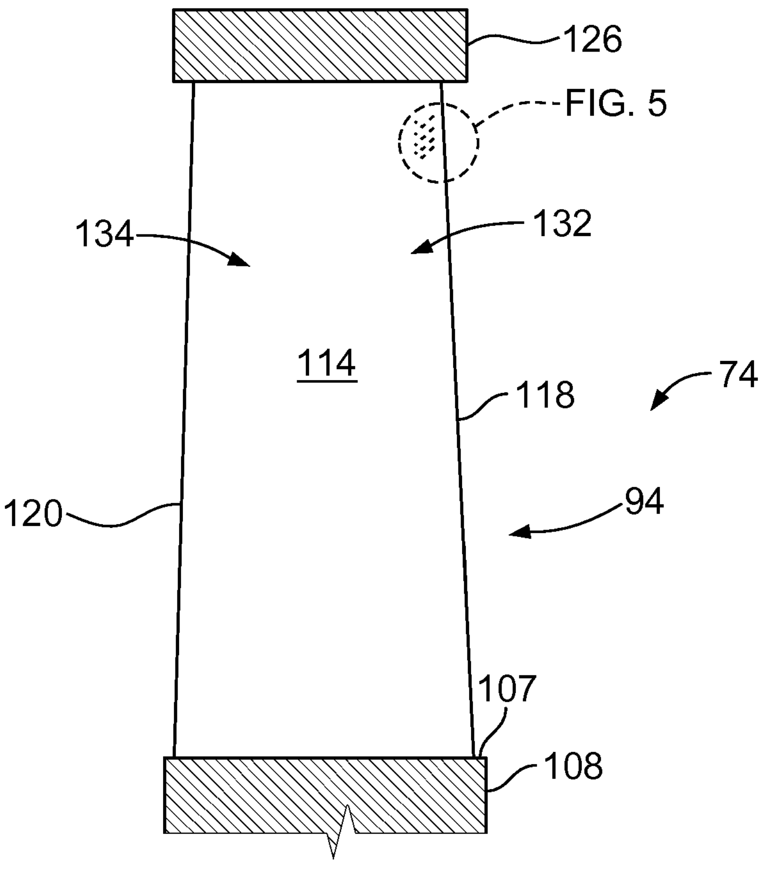
FIG. 4 is a right side elevational view of the turbine bucket shown in of FIG. 3.

FIG. 3 is an enlarged perspective view of an exemplary bucket 74, and FIG. 4 is a cross-section view of bucket 74. It is understood that each bucket 74 in the corresponding rotor disk assembly 60 may be substantially identical or alternatively, at least some of the other buckets in assembly 60 may be different than bucket 74. In the exemplary embodiment, turbine bucket 74 includes airfoil 94, a platform 107, and a shank 108. (Dovetail 96 is removed for clarification purposes only.) Airfoil 94 includes a first sidewall 110 and an opposite second sidewall 112. In the exemplary embodiment, first sidewall 110 is convex and defines a suction side 114 of airfoil 94, and second sidewall 112 is concave and defines a pressure side 116 of airfoil 94. First sidewall 110 is coupled to second sidewall 112 along a leading edge 118 and along an opposite trailing edge 120. More specifically, airfoil trailing edge 120 is spaced chord-wise and downstream from airfoil leading edge 118. First sidewall 110 and second sidewall 112 each extend radially outwardly from a blade root 122 towards an airfoil tip 124. Blade root 122 extends from platform 107. In the exemplary embodiment, a tip cover 126 is coupled to airfoil tip 124 adjacent to nozzle carrier 62. Tip cover 126 may include a plurality of sealing assemblies (not shown) that form a tortuous sealing path between nozzle carrier 62 and turbine bucket 74.

Figure 5:
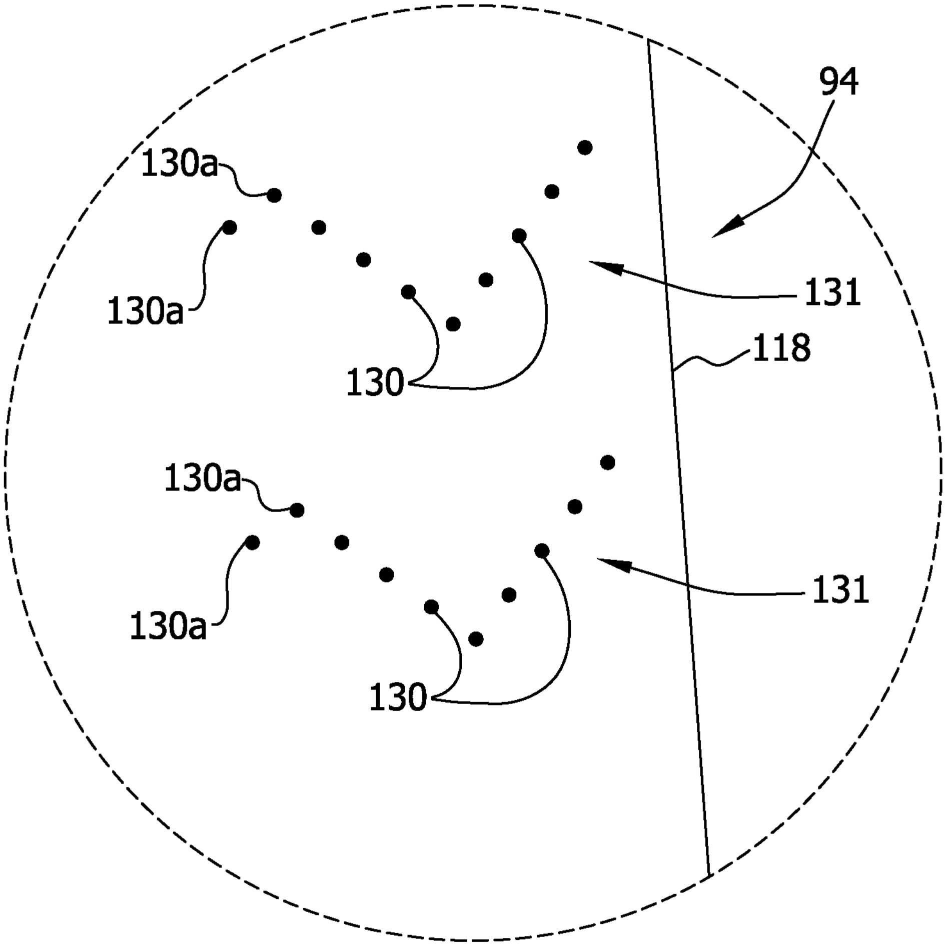
FIG. 5 is an enlarged view of a portion of the turbine bucket shown in FIG. 4 and taken along area 5; including exemplary wear-indicating marks.
Figure 6:
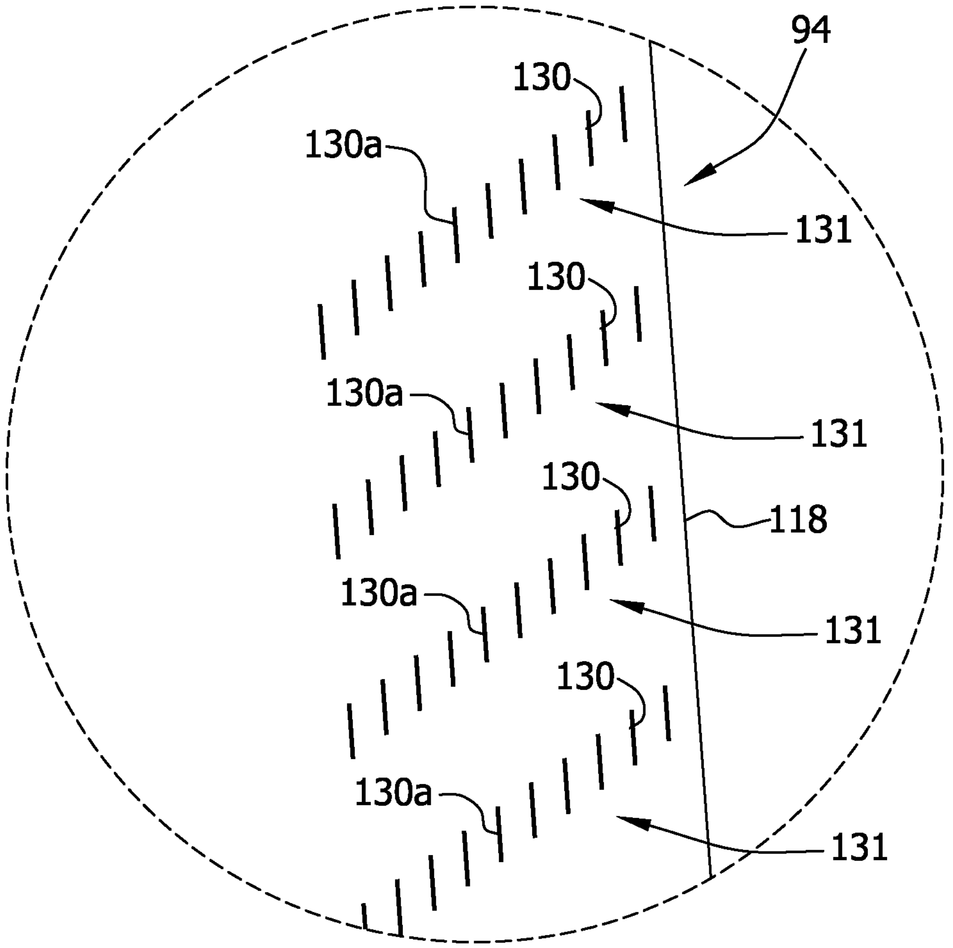
FIG. 6 is an enlarged view of a portion of the turbine bucket shown in FIG. 5 and including alternative wear-indicating marks.

FIG. 5 is an enlarged fragmentary view of an upper portion 132 of airfoil leading edge 118. FIG. 6 is an enlarged view of a portion of the turbine bucket shown in FIG. 5 and including alternative wear-indicating marks. A plurality of wear-indicating marks 130 are applied in groups 131 to leading edge margin 132 of airfoil pressure side 116. Specifically in the exemplary embodiment, ten marks 130 are applied in two groups 131 such that marks 130 are adjacent to airfoil tip 124. Alternatively any suitable number of wear-indicating marks 130, including one, and any suitable number of groups 131, including one, may be applied to a surface (e.g., side) such that marks 130 are a predefined distance from an edge. Wear-indicating marks 130 are visibly discernible from leading edge margin 132 through boroscopic inspection, and each mark 130 has an inner extent 130*a* that is spaced a pre-selected chordwise distance D from leading edge 118. As such, each wear-indicating mark 130 may be used to determine and is indicative of a distance measured from leading edge 118. More specifically, in the exemplary embodiment, marks 130 are erosion-indicating marks, and each mark 130 is configured to disappear, erode, or otherwise become detached or removed from airfoil 94, after a portion of airfoil to which wear-indicating mark 130 is applied has ground or worn a predetermined amount. Although wear-indicating marks 130 are illustrated as being applied to airfoil 94, marks 130 may, alternatively or in the addition to be applied to other internal components of turbine 12, including other components of bucket 74, including but not limited to platform 107, shank 108, and dovetail.

In the exemplary embodiment, wear-indicating marks 130 are applied to leading edge margin 132 along airfoil pressure side 116 such that marks 130 are adjacent to airfoil tip 124, because leading edge margin 132 is considered to be most susceptible to erosion. Moreover, the exemplary embodiment group 131 are applied to airfoil 94 to extend substantially across approximately one-third of an upper portion of airfoil 94 adjacent airfoil tip 124. Alternatively group(s) 131 may extend across a different or smaller portion of airfoil 94, such as but not limited approximately one-fourth of airfoil 94 or approximately one-fifth of airfoil 94. Other portions of airfoil 94 are also susceptible erosion, and as such, marks 130 may be applied to a trailing edge margin 134 of pressure side 116, to a leading edge margin 136 of suction side 114, and/or to a trailing edge margin (not shown) of suction side 114. Any one or all of these wear-indicating marks 130 may be applied to airfoil 94 in addition to, or in lieu of, the marks 130 applied to leading edge margin 132 of pressure side. Moreover, wear-indicating marks 130 may be applied at other portions of the respective edge margins 132, 134, and/or 136, other than, or in addition to, portions adjacent to airfoil tip 124.

In the exemplary embodiment, wear-indicating marks 130 in each group 131 are discrete, substantially uniform in size and shape (e.g., circular), and have inner extents 130*a* that are substantially uniformly-spaced apart from one another in a chordwise direction from leading edge 118. Wear-indicating marks 130 in each group 131 are also spaced apart longitudinally with respect to leading edge 118 such that marks 130 are not aligned chordwise with respect to the leading edge. It is understood that marks 130 may not be uniform in size and shape, and/or that inner extents 130*a* may not be uniformly spaced from one another in a chordwise direction from leading edge 118, without departing from the scope of the present invention. For example, adjacent inner extents 130*a* of wear-indicating marks 130 that are closest to leading edge 118 may be spaced closer together than adjacent inner extents 130*a* of wear-indicating marks 130 that more remote from leading edge 118. Moreover, wear-indicating marks 130 may be substantially aligned chordwise, as opposed to being longitudinally-spaced apart.

In the embodiment illustrated in FIG. 5, erosion-indicated marks 130 are in the form of circular dimples or depressions or airfoil 94. More specifically in the exemplary embodiment, marks 130 have substantially uniform diameters of between about 1.2 in (30 mm) to about 1.6 in (40 mm) The dimples or depressions may be formed by any suitable method, including but not limited to stamping, and/or embossing. Moreover, marks 130 may be of other forms and/or configurations other than dimples or depressions. For example, marks 130 may be raised bumps, or other protruding marks, which may be formed by any suitable method, including but not limited to stamping, and/or embossing.

FIG. 6 is an enlarged view of a portion of the turbine bucket shown in FIG. 5 and including alternative wear-indicating marks. In the example illustrated in FIG. 6, wear-indicating marks 130 may be lines or shapes formed by lines. Such lines may be formed by any suitable method, including but not limited to scribing or by applying a colored material (e.g., paint or dye) to airfoil 94. In yet another example, wear-indicating marks 130 may be in the form of images, which may be applied to the airfoil 94 by any suitable method, including but not limited to scribing, printing, coloring, and/or dyeing, for example. The images may be any suitable image of any suitable shape, symbol or design, and may be of any suitable color. For example, in such an embodiment, at least one indicating mark 130 may have a different color than the other indicating marks 130.

Figure 7:
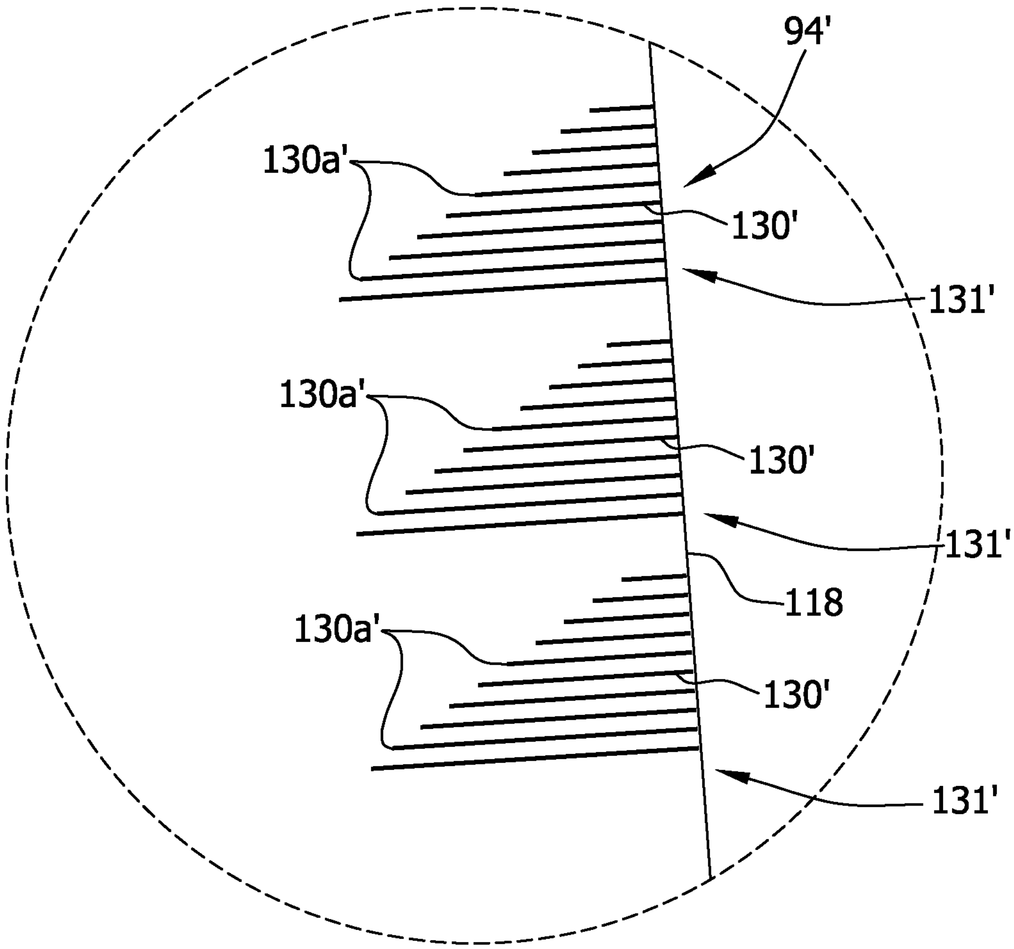
FIG. 7 is an enlarged view of a portion of the turbine bucket shown in FIG. 5 and including alternative wear-indicating marks.

FIG. 7 is an enlarged view of a portion of the turbine bucket shown in FIG. 5 and including alternative wear-indicating marks. In the exemplary embodiment of FIG. 7, wear-indicating marks are indicated at 130', and like components are indicated by corresponding reference numerals having first prime symbols ('). Wear-indicating marks 130' are in the form of discrete chordwise lines, that each initiate from leading edge 118' and having different inner extents 130*a'* that are spaced a pre-selected distance from leading edge 118'. Wear-indicating marks 130' are spaced longitudinally apart with respect to leading edge 118. Wear-indicating marks 130' may be of any shape that enables the marks to function as described here. Wear-indicating marks 130' may be applied to airfoil 94' by any suitable method, including but not limited to stamping, embossing, scribing, printing, coloring, and/or dyeing.

Depending on a chordwise extent of erosion of airfoil 94, one or more of wear-indicating marks 130 and/or 130', erode, disappear, or otherwise become detached from leading edge margin 132 of airfoil 94 during use of turbine 12. During inspection of airfoil 94 and/or 94' using a boroscope, a technician can determine the amount of erosion of airfoil 94 and/or 94' by counting the number of wear-indicating marks 130 and/or 130' remaining on airfoil 94 and/or 94'. In FIG. 5, for example, there are ten wear-indicating marks 130 and 130' that have inner extents 130*a* and 130*a'*, respectively, that are spaced at about 0.4 in (10 mm) intervals from leading edge 118 and/or 118'. Using this example, if a technician counts three wear-indicating marks 130, 130' remaining on airfoil 94, 94', then the technician is able to determine that airfoil 94 and/or 94' has a chordwise erosion extent of about 2.8 in (70 mm). Regardless of whether the chordwise distances defined between adjacent wear-indicating marks 130, 130' are uniform or not, as long as the distances from leading edge 118, 118' (or other surface edges) to the wear-indicating marks 130 and/or 130' are known or deducible, an amount chordwise erosion of airfoil 94, and/or 94' is readily determinable by identifying remaining wear-indicating marks 130, 130' using a boroscope.

A chordwise dimension (e.g., a diameter) of each wear-indicating mark 130 may also be pre-selected and known. As such, an amount of erosion extent of airfoil 94 may be even more accurately determined when a portion (e.g., one-fourth, one-half, or three-fourths) of one of wear-indicating marks 130 remains on the airfoil and is identifiable by the technician. For example, in one embodiment, each indicating mark 130 may have a diameter of about 1.2 in (30 mm) to about 1.6 in (40 mm).

The above-described wear inspection system and method of use provides a cost-effective and reliable method for inspecting internal components of a turbine for erosion. In particular, the above-described erosion inspection system facilitates improving the quantitative assessment of determining the amount of erosion of an internal component of the turbine, such as one or more airfoils. As such, the erosion inspection system and method may permit an engineering evaluation that extends the time between outages and further facilitates improving the efficiency of the turbine.

Exemplary embodiments of the erosion inspection system and methods are described above in detail. The methods and systems are not limited to the specific embodiments described herein, but rather, components of systems and/or steps of the method may be utilized independently and separately from other components and/or steps described herein. For example, the methods and systems may also be used in combination with other rotary engine systems and methods, and are not limited to practice with only the steam turbine engine as described herein. Rather, the exemplary embodiment can be implemented and utilized in connection with many other rotary system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wear-indicating system comprising:

a component for use within a turbine, said component comprising a surface extending from a first surface edge to an opposite second surface edge, wherein said first surface edge and a corresponding surface edge margin are susceptible to wear during turbine operation; and a plurality of discrete wear-indicating marks formed along said surface, each of said discrete wear-indicating marks located in a discrete portion of said surface edge margin and visually discernible from said surface edge margin through visual inspection, said plurality of discrete wear-indicating marks arranged in a sequence from said first surface edge to said second surface edge such that a first discrete wear-indicating mark is spaced a distance from a second discrete wear-indicating mark, and each subsequent discrete wear-indicating mark is substantially uniformly spaced apart from an adjacent discrete wear-indicating mark, wherein each said discrete wear-indicating mark is configured to visually disappear from said surface edge margin after said discrete portion of said surface edge margin has worn a predetermined amount.

2. The wear-indicating system in accordance with claim 1 wherein each said discrete wear-indicating mark is configured to erode upon erosion of said discrete portion of said surface edge margin along which the wear-indicating mark is formed.

3. The wear-indicating system in accordance with claim 1 wherein each said discrete wear-indicating mark is configured to detach from said component after said discrete portion of said surface edge margin containing said each discrete wear-indicating mark has worn a predetermined amount.

4. The wear-indicating system in accordance with claim 1 wherein each said discrete wear-indicating mark is formed along said surface at a different pre-selected distance from said first surface edge.

5. The wear-indicating system in accordance with claim 4 wherein said plurality of discrete wear-indicating marks are configured such that a quantifiable extent of a predetermined amount of wear is readily determinable by counting a number of wear-indicating marks remaining along said surface edge margin.

6. The wear-indicating system in accordance with claim 1 wherein said component comprises an airfoil for a turbine bucket, said surface defined by one of a pressure side and a suction side of said airfoil, said first surface edge comprising at least one of a leading edge and a trailing edge of said airfoil, wherein at least a portion of each said discrete wear-indicating mark is spaced a pre-selected, chordwise distance from said first surface edge.

7. The wear-indicating system in accordance with claim 6 wherein said first surface edge comprises the leading edge of said airfoil.

8. A turbine comprising:

a casing defining an interior space;

a plurality of turbine buckets rotatably coupled within said interior space, each of said turbine buckets comprises an airfoil comprising an outer surface, a leading edge, and a trailing edge; and a plurality of discrete wear-indicating marks formed along said outer surface, each discrete wear-indicating mark located in a discrete portion of at least one of a leading edge margin defined adjacent to said leading edge, and a trailing edge margin defined adjacent to said trailing edge, said plurality of discrete wear-indicating marks arranged in a sequence in a chordwise direction between said leading edge and said trailing such that a first discrete wear-indicating mark is spaced a distance from a second discrete wear-indicating mark, and each subsequent discrete wear-indicating mark is substantially uniformly spaced apart from an adjacent discrete wear-indicating mark, wherein each said discrete wear-indicating mark is visually discernible from at least one of said leading edge margin and said trailing edge margin when visually inspected, and wherein each said discrete wear-indicating mark is configured to visually disappear from at least one of said leading edge margin and said trailing edge margin after said discrete portion of said at least one of said leading edge margin and said trailing edge margin has worn a predetermined amount.

9. The turbine set forth in claim 8 wherein each said discrete wear-indicating mark is configured to erode upon erosion of said discrete portion of at least one of said leading edge margin and said trailing edge margin.

10. The turbine set forth in claim 8 wherein each said discrete wear-indicating mark is positioned at a distinct pre-selected chordwise distance from a corresponding one of said leading edge and said trailing edge.

11. The turbine set forth in claim 10 wherein said plurality of discrete wear-indicating marks are configured such that a chordwise extent of erosion of said outer surface is readily determinable by counting a number of said discrete wear-indicating marks remaining along at least one of said leading edge margin and said trailing edge margin.

12. The turbine set forth in claim 8 wherein said outer surface is defined by one of a pressure side and a suction side of said airfoil, each said discrete wear-indicating mark formed along a discrete portion of at least one of said leading edge margin of said suction side and said leading edge margin of said pressure side.

13. A method for inspecting an internal component in an interior of a turbine, said method comprising:

forming a plurality of discrete wear-indicating marks along a discrete portion of a surface edge margin of the component, the plurality of discrete wear-indicating marks arranged in a sequence in a direction away from the surface edge margin such that a first discrete wear-indicating mark is spaced a distance from a second discrete wear-indicating mark, and each subsequent discrete wear-indicating mark is substantially uniformly spaced apart from an adjacent discrete wear-indicating mark, wherein the discrete wear-indicating marks are visually discernible from the surface edge margin through visual inspection, and wherein the discrete wear-indicating marks are configured to visually disappear from the surface edge margin after the discrete portion of the surface edge margin has worn a predetermined amount;

counting a number of the discrete wear-indicating marks remaining along the surface edge margin; and determining an amount of wear of the surface edge margin of the internal component based on the number of discrete wear-indicating marks remaining along the surface edge margin.

14. The method set forth in claim 13 wherein each discrete wear-indicating mark of the plurality of discrete wear-indicating marks is configured to erode upon erosion of the discrete portion of the surface edge margin on which the discrete wear-indicating marks is formed.

15. The method set forth in claim 13 wherein each discrete wear-indicating mark of the plurality of discrete wear-indicating marks is configured to detach from the internal component upon erosion of the discrete portion of the surface edge margin on which the wear-indicating marks is formed.

16. The method set forth in claim 13 wherein each respective discrete wear-indicating mark is positioned at a distinct pre-selected distance from the surface edge.

17. The method set forth in claim 13 further comprising inspecting the internal component using a boroscope when the internal component is in the interior of the turbine.

18. The method set forth in claim 13 wherein the internal component includes an airfoil for a bucket, the surface defined by one of a pressure side and a suction side of the airfoil, the surface edge including at least one of a leading edge and a trailing edge between the pressure side and the suction side of the airfoil, wherein at least a portion of each discrete wear-indicating mark is spaced a pre-selected, chordwise distance from the surface edge.

19. The wear-indicating system in accordance with claim 1 wherein said plurality of discrete wear-indicating marks comprise at least one discrete group of discrete, parallel wear-indicating marks that are substantially uniformly spaced apart longitudinally with respect to said surface edge, each of said wear-indicating marks extends from said surface edge.

20. The wear-indicating system in accordance with claim 1 wherein said plurality of discrete wear-indicating marks comprise at least one discrete group of discrete, parallel wear-indicating marks that are substantially uniformly spaced apart in a direction away from said surface edge, each of said wear-indicating marks extends substantially parallel to said surface edge.

* * * * *